United States Patent [19]

Shum et al.

[11] 4,182,981
[45] Jan. 8, 1980

[54] APPARATUS FOR GAUGING THE SHAPE OF A CONDUCTING SURFACE

[75] Inventors: Lanson Y. Shum, Greensburg; James N. Brecker, Mt. Lebanon, both of Pa.

[73] Assignee: Westinghouse Electric Corp., Pittsburgh, Pa.

[21] Appl. No.: 858,861

[22] Filed: Dec. 8, 1977

[51] Int. Cl.² ............................................. G01R 27/26
[52] U.S. Cl. ................................... 324/61 R; 361/280; 340/200
[58] Field of Search ............... 324/61 P, 61 R; 73/104; 361/280; 340/200

[56] References Cited

U.S. PATENT DOCUMENTS

| | | | |
|---|---|---|---|
| 2,417,062 | 3/1947 | Coake | 324/61 P |
| 2,604,512 | 7/1952 | Bacon et al. | 324/61 P |
| 2,649,579 | 8/1953 | Alexander | 324/61 P |
| 3,176,286 | 3/1965 | Dschen | 324/61 P |
| 3,191,158 | 6/1965 | Sherman | 324/61 P |
| 3,523,246 | 8/1970 | Hall et al. | 324/61 R |
| 3,771,051 | 11/1973 | Abbe | 324/61 R |

FOREIGN PATENT DOCUMENTS 1220783   1/1971   United Kingdom .................. 324/61 R

*Primary Examiner*—Stanley T. Krawczewicz
*Attorney, Agent, or Firm*—J. W. Keen

[57] ABSTRACT

An apparatus for gauging the shape of a specimen conducting surface or load distribution between normally mateable specimen conducting surfaces. A capacitance pad which is insertable between the specimen surface in question and a reference surface of known shape or normally mateable surfaces has multiple electrodes sandwiched between dielectric plates which are, during operation, situated adjacent the reference and specimen surfaces. The electrodes in the capacitance pad may be individually energized and selectively connected to a capacitance measuring circuit. Capacitance between the reference and specimen surfaces or between the normally mateable specimen surfaces changes the frequency of the measuring circuit when selected capacitance pad electrodes are connected to that circuit. The measuring circuitry counts the pulses emitted by an included oscillator within a selected period of time with the number of pulses being inversely proportional to the capacitance and, thus, also inversely proportional to the distance separating the surfaces. The distance between the surfaces is inversely related to the force or pressure on the sandwiched electrodes. By varying the period of pulse counting or dividing the number of pulses counted by selected numbers the specimen's surface shape or pressure distribution between mateable specimen surfaces may be displayed directly in the dimensional units desired.

11 Claims, 6 Drawing Figures

APPARATUS FOR GAUGING THE SHAPE OF A CONDUCTING SURFACE

BACKGROUND OF THE INVENTION

1. Field of the Invention

This invention relates to capacitance gauging apparatus for the calibration of surface shapes and determination of load distribution between meteable surfaces.

2. Description of the Prior Art

Many rotating apparatus have thrust bearing pads that are accurately machined and lapped. Bearing surfaces and runners that mate therewith sustain less operating friction and thus increase the efficiency of the utilizing apparatus when the pads are flat or nearly so. To insure mating surface flatness the bearing pads are periodically inspected to determine their flatness. Inspection procedures of the past have commonly involved using large straight edges and feeler papers. Such measuring instruments have inherent disadvantages since the straight edges cover only a small percentage of the area to be inspected making the inspection procedure very time consuming and the results dependent upon the inspector's skill since a great deal of human judgment is needed in using the feeler papers to determine the size of the separation gap between the bearings and runners.

Copending Patent Application Ser. No. 723,269, filed Sept. 15, 1976, U.S. Pat. No. 4,103,226, and assigned to the assignee of the present invention discloses an apparatus for gauging the texture of a conductive surface. The probe of the texture gauging device determines, on a minute scale, the finish or texture of the surface in question and is unsuitable for determining general surface conditions, shapes, or configurations. FIG. 2 of the previously mentioned prior art Patent Application graphically illustrates the minute surface measuring features made possible by the included deformable elastomer.

While surface finish is often important, the general character or shape of mateable surfaces is also important. Prior attempts to accurately measure such general surface characteristics have disadvantages which include high operator skill levels, readings which are often ambiguous and require interpretation, and high cost which is justifiable only in large laboratories, machine shops, or manufacturing facilities.

SUMMARY OF THE INVENTION

Apparatus is provided for gauging the shape of an electrically conductive specimen surface and for determining load distribution on two normally mateable specimen surfaces. A capacitance pad having a plurality of electrodes disposed between electrical insulation is insertable between an electrically conductive reference surface and specimen surface or between two normally mateable specimen surfaces. The capacitance pad's electrodes have separate electrical leads which permits capacitance measurement between surfaces for each electrode. Means are provided for measuring the capacitance between the specimen and reference surfaces or between the normally mateable specimen surfaces across each electrode to thereby establish the separating distances and the load distribution therebetween respectively.

DESCRIPTION OF THE PREFERRED EMBODIMENT

Figure 1:
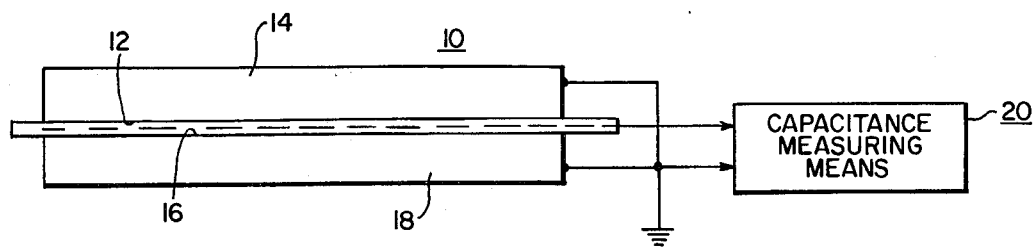
FIG. 1 is a schematic view of the invention.

FIG 1 illustrates capacitance pad 10 disposed between surface 12 of a first conductive member 14 and surface 16 of second conductive member 18. Conductive members 14 and 18 are electrically grounded and capacitance pad 10 is electrically connected to capacitance measuring means 20. In the case where it is desired to measure the shape of surface 16, first member 14 assumes the role of a reference surface which may be a standard metallic marking table or a specially ground or lapped flat plate whose shape has been determined by calibration against such a marking table. In the case where surface registry and continuous contact is of primary importance rather than absolute flatness of surfaces 12 and 16, capacitance pad 10 may be used to determine the separation distances and thus the pressure loading distribution therebetween.

A very important application of the present invention is for bearings and in particular thrust bearings and runners associated therewith. Manufacturing of thrust bearing pads such as Kingsberry Ring Type pads involves accurately machined and lapped surfaces. A complete ring having such surfaces which are often babbitted is divided into segments with each segment being scraped and checked for the desired flatness tolerance. In order to check the flatness tolerance of each thrust bearing shoe a reference plate member 14 is used with each thrust bearing shoe which assumes the role of second plate member 18 as shown in FIG. 1. Since the surface of each bearing shoe is treated and inspected independently, it is tacitly assumed that when they are assembled onto the foundation which supports the bearing, the whole thrust bearing assembly should be perfectly flat. There are, however, many factors that may contribute to errors in the final bearing surface flatness such as relative misalignment of the babbitted bearing pad segments, incorrect alignment of the bearing's foundation member, misalignment of/or nonplanar surface on the bearing runner, and distortion of the bearing foundation structure when the rotatable member is set in place thereon. It is thus often desirable to also measure the load distribution on the normally mateable bearing surfaces when the thrust bearing is completely assembled and the rotor is mated therewith. In such case the thrust bearing runner assumes the role of first member 14 and the thrust bearing pads assume the role of second plate member 18. Due to capacitance pad 10's small thickness (better shown in FIG. 2) alignment of the thrust bearing assembly or other mateable surfaces is not significantly altered from its operating configuration. Capacitance pad 10 can be used to obtain the load distribution on each thrust bearing pad by measuring the capacitance between the thrust bearing runner and each thrust bearing pad for various angular positions of the rotor to which the thrust bearing runner is affixed.

Figure 2A:
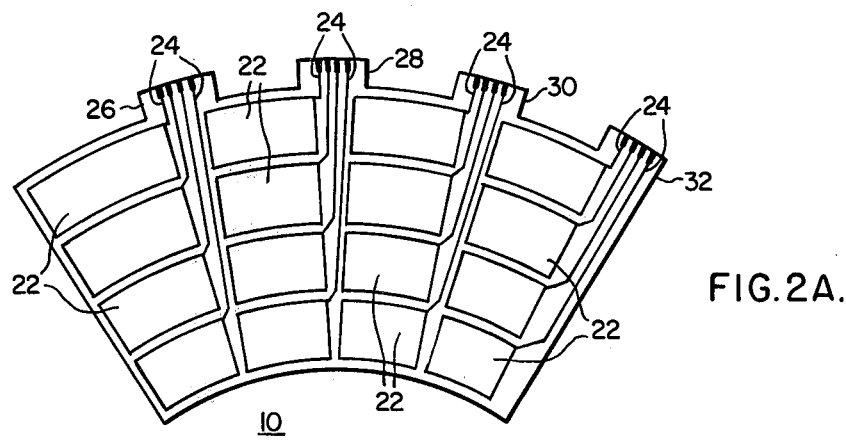
FIGS. 2A and 2B are plan and elevation views respectively of the capacitance pad shown in FIG. 1.

FIG. 2A illustrates a plan view of capacitance pad 10 which includes a plurality of electrodes 22 which are separately electrically connected to one edge of pad 10 by leads 24. The shape of capacitance pad 10 is illustrated in FIG. 2A as approximately conforming to an ordinary thrust bearing pad, but it is to be understood that the shape of such capacitance pad 10 and distribution of electrodes 22 may be altered as appropriate and desired. Leads 24 from predetermined numbers (in this case 4) of electrodes 22 are grouped along the edge of capacitance pad 10 at convenient locations 26, 28, 30, and 32 so as to provide electrical terminal groups whose individual members may be selectively connected to the capacitance measuring means 20.

Figure 2B:
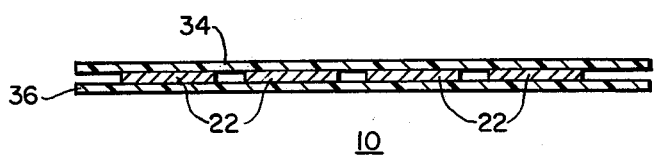

FIG. 2B illustrates an elevation view of capacitance pad 10 and is instructive to illustrate a possible manufacturing technique for such pad 10. The array of electrodes 22 can be produced by printed circuit production techniques in attachment of electrodes 22 to dielectric plate 34 to constitute a printed circuit board. Laminating the resulting printed circuit board to dielectric 36 permits formation of a completely insulated capacitance pad 10. Commonly used electrode material includes copper whose thickness is on the order of 0.002 inches. Dielectric plates 34 and 36 commonly constitute polyethylene terephthalate resin or kapton R and have a thickness on the order of 0.001–0.003 inches. The total thickness of such capacitance pad 10 is then on the order of 0.004 to 0.008 inches in thickness.

Figure 3:
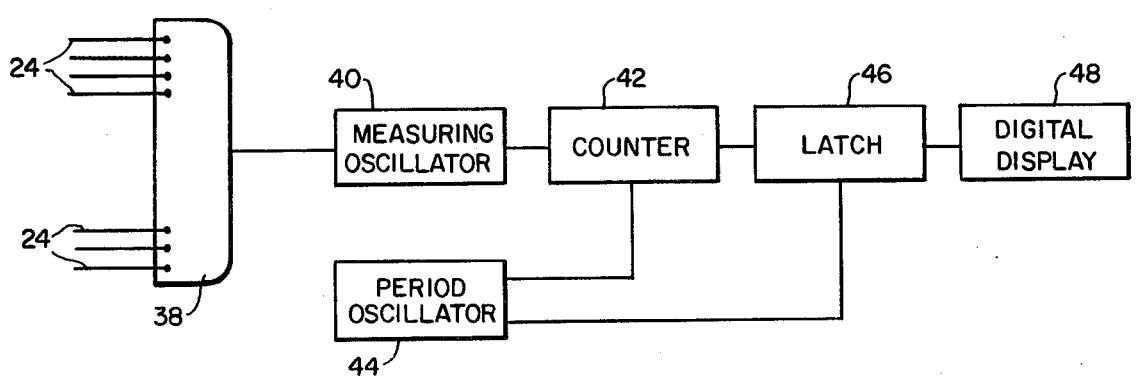
FIG. 3 is an electrical schematic of the capacitance measuring means illustrated in FIG. 1.

FIG. 3 illustrates the capacitance measuring means 20 illustrated in FIG. 1. Switch 38 selectively connects electrical leads 24 to measuring oscillator 40 whose output frequency is inversely proportional to the resulting circuit's capacitance value. Counter 42 measures the number of output pulses from measuring oscillator 40 with the contents of counter 42 being periodically initialized by period oscillator 44. Immediately prior to initializing counter 42, period oscillator 44 gates the contents of counter 42 to latch 46. Such gated latch contents may then be shown by display 48.

Figure 4:
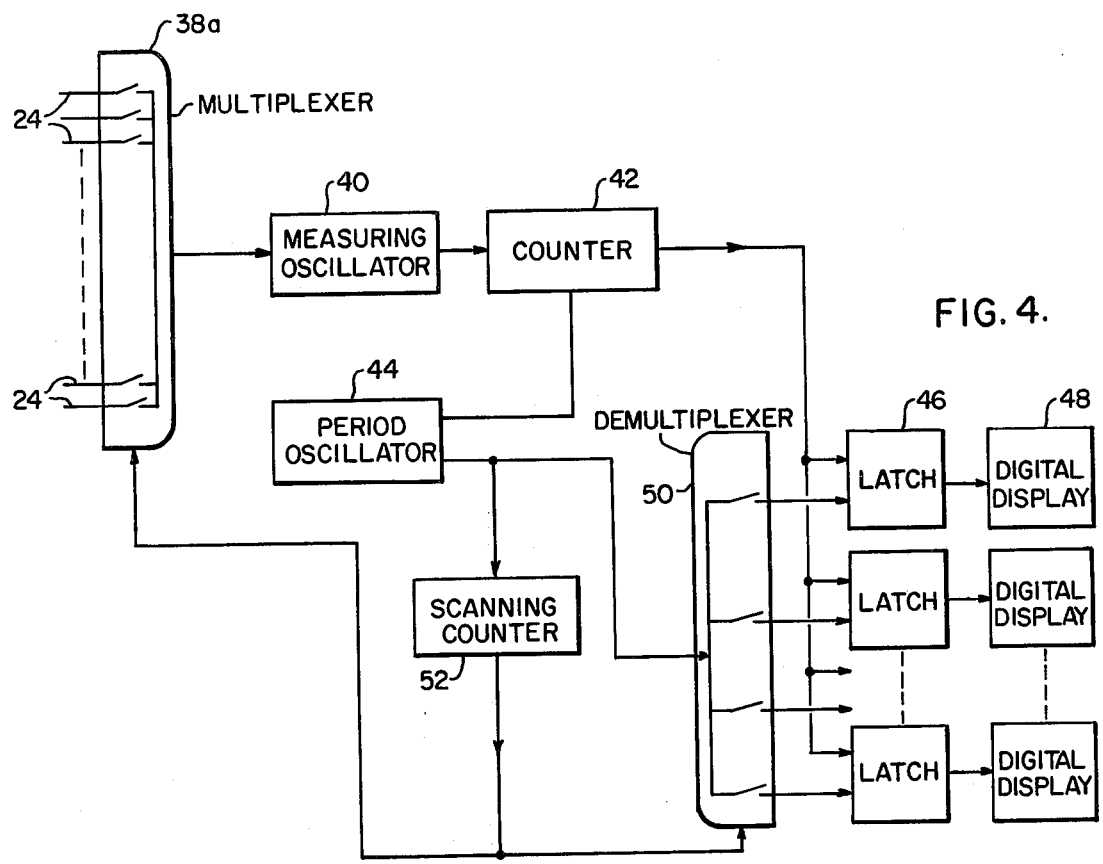
FIG. 4 is a second embodiment of the capacitance measuring means illustrated in FIG. 1.

FIG. 4 illustrates an alternate electrical schematic for the capacitance measuring means 20 illustrated in FIG. 1. Multiplexing means 38a is used to selectively connect electrical leads 24 to measuring oscillator 40. Period oscillator 44 periodically initializes counter 42 and gates the contents of counter 42 to the latch 46 selected by demultiplexer 50. Scanning counter 54 provides appropriate addresses to multiplexer 38a and demultiplexer 50 so as to form a 1:1 relationship between each electrical lead 24 and each digital display 48. As illustrated in FIG. 4, scanning counter 52 is stepped by period oscillator 44.

Figure 5:
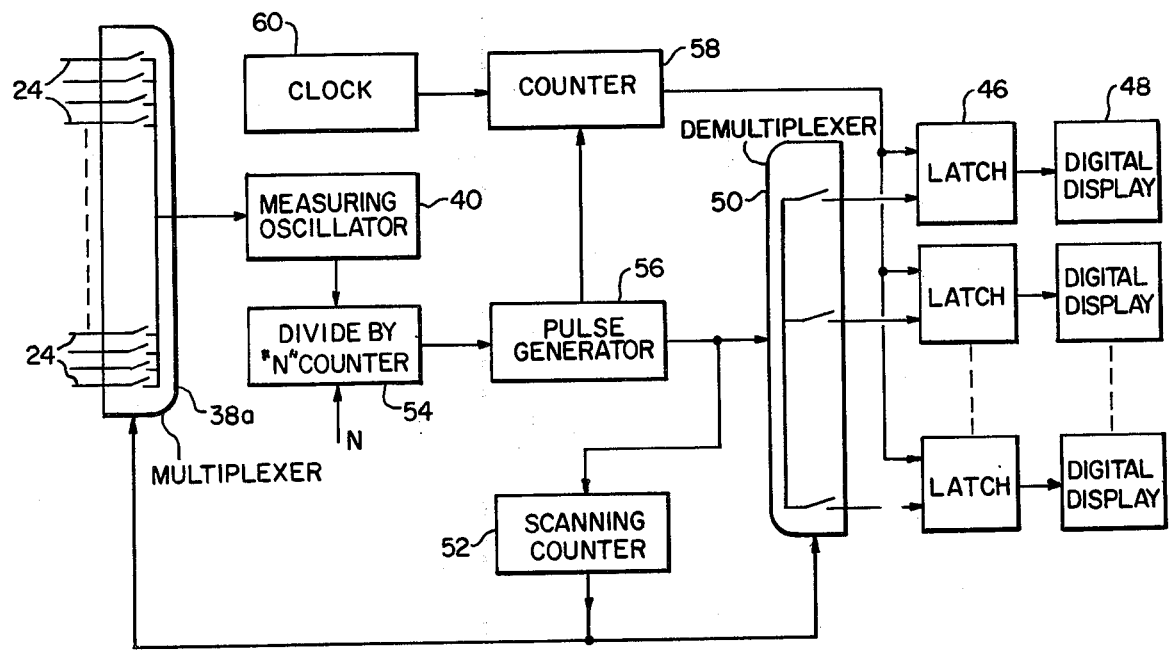
FIG. 5 is a third embodiment of the capacitance measuring means illustrated in FIG. 1.

The electrical schematic illustrated in FIG. 5 is primarily utilized for load distribution applications. Multiplexer 38a electronically connects selected electrical leads 24 to measuring oscillator 40. The output of oscillator 40 is monitored by a divide-by-n counter 54. The value of n is arranged to be input and is useful in eliminating interference from most 60-cycle noise in the surroundings and for developing proper dimensional units in the display 48. The pressure loading distribution is related to the period of oscillation of an oscillator (40) placed in a capacitance circuit. For every predetermined number of oscillations (n), the divide-by-n counter 54 triggers pulse generator 56 which initializes high-speed counter 58 and gates the contents thereof to the appropriate latch 46 from whence it may be displayed by individual displays 48. Since the loading pressure distribution is related to the period of oscillation, high-speed counter 59 records the passage of time from clock 60. Pulse generator 56 signals scanning counter 52 which supplies the proper data addresses which result in a 1:1 correspondence between electrical leads 24 and displays 48.

The present invention may be appropriately packaged to permit use in a machine shop or construction site while retaining the precision necessary for distinguishing distances of 0.00001 inches. Furthermore, the present invention, while being unambiguous and virtually instantaneous, requires minimal operator skill and interpretation. The invention is also easily interfaced to a data logger or programmable calculator for automatic inspection and record keeping. Zero offset readings given by the present invention may be suitably corrected by utilizing a reference surface such as a marking table and making the appropriate adjustment to obtain a zero reading. Such zero offset adjustment may also be utilized to set an acceptance-rejection transition point for inspection purposes. In such a case positive and negative reading would be indicative of acceptance and rejection respectively or vice-versa.

We claim:

1. An apparatus for gauging the shape of an electrically conductive specimen surface, said apparatus comprising:
   an electrically conductive reference surface of known shape;
   a capacitance pad having a plurality of transversely separated electrodes disposed in a single layer between two layers of electrical insulation, said pad being insertable between and contactible with said specimen surface and said reference surface; and
   means for measuring the capacitance of each electrode in said capacitance pad to establish the distances separating said reference surface from said specimen surface.

2. The apparatus of claim 1 wherein said electrodes are arranged in a predetermined transversely spaced relationship, each of said electrodes having an electrical lead which extends to said pad's edge, said leads from selected electrodes being grouped in a plurality of terminal groups along said pad's edge.

3. The apparatus of claim 1, said measuring means comprising:
   a measuring oscillator whose output frequency is inversely proportional to the capacitance of the reference surface, capacitance pad, and specimen surface, said measuring oscillator having a first and second connection terminal with said first terminal being electrically connected to said reference and specimen surfaces;
   means for electrically connecting the second terminal of said oscillator to the leads of selected electrodes;
   means for counting the oscillations which are output by said measuring oscillator;
   means for initializing the contents of said counting means at predetermined time intervals;
   means for storing data;
   means for gating the contents of said counting means to said data storage means at predetermined times; and
   means for displaying the contents of said data storage means.

4. The apparatus of claim 1, said electrical connecting means comprising:
   multiplexing means.

5. The apparatus of claim 4 further comprising:
means for supplying appropriate addresses to said multiplexing means.

6. The apparatus of claim 5, said address supply means comprising:

7. An apparatus for measuring load distribution between normally mateable electrically conductive surfaces, said apparatus comprising:
- a capacitance pad having a plurality of transversely separated electrodes disposed in a single layer between two layers of electrical insulation, the thickness of each electrode perpendicular to said transverse separation constituting the thickness of said single layer, said pad being insertable between and contactible with the normally meteable surfaces; and
- means for measuring the capacitance of each electrode in said capacitance pad to establish the load distribution between the normally mateable surfaces.

8. The apparatus of claim 7 wherein said electrodes are arranged in transversely spaced relationship, each of said electrodes having an electrical lead which extends to said pad's edge, said leads from predetermined electrodes being grouped in a plurality of terminal groups along said pad's edge.

9. The apparatus of claim 7, said measuring means comprising:
- a measuring oscillator whose output frequency is inversely proportional to the capacitance of the normally mateable surfaces and said capacitance pad, said measuring oscillator having a first and second terminal with said first terminal being electrically connected to said mateable surfaces;
- means for electrically connecting the second terminal of said measuring oscillator to selected electrodes;
- means for measuring time intervals;
- means for counting the pulses output by said measuring oscillator, said counting means providing a signal for each selected number of oscillations counted;
- means for initializing said time interval measuring means in response to said counting means signal;
- means for storing multiple data;
- means responsive to said counting means signal for gating the contents of said time interval measuring means to said data storage means; and
- means for displaying the contents of said data storage means.

10. The apparatus of claim 9, said electrical connecting means comprising:
- multiplexing means responsive to an addressing signal which selects the electrode to be connected to said measuring oscillator; and
- an address counter responsive to said counting mean's signal, said address counter providing said addressing signal.

11. The apparatus of claim 10, further comprising:
demultiplexing means for providing electrical connection between said time interval measuring means and selected data storage means, said demultiplexing means being responsive to said address counter's signal in selecting said data storage means.

* * * * *